United States Patent
Batscha et al.

(10) Patent No.: US 9,671,138 B2
(45) Date of Patent: *Jun. 6, 2017

(54) CASCADED POWER PLANT USING LOW AND MEDIUM TEMPERATURE SOURCE FLUID

(71) Applicant: ORMAT TECHNOLOGIES, Inc., Reno, NV (US)

(72) Inventors: Dany Batscha, Kiriat Ono (IL); Rachel Huberman, Moshav Galia (IL)

(73) Assignee: ORMAT TECHNOLOGIES, INC., Reno, NV (US)

( * ) Notice: Subject to any disclaimer, the term of this patent is extended or adjusted under 35 U.S.C. 154(b) by 328 days.

This patent is subject to a terminal disclaimer.

(21) Appl. No.: 14/549,318

(22) Filed: Nov. 20, 2014

(65) Prior Publication Data

US 2015/0075164 A1  Mar. 19, 2015

Related U.S. Application Data

(63) Continuation-in-part of application No. 14/086,655, filed on Nov. 21, 2013, now Pat. No. 9,341,086, which is a continuation-in-part of application No. 13/190,148, filed on Jul. 25, 2011, now Pat. No. 8,667,799.

(51) Int. Cl.
*F24J 3/08* (2006.01)
*F03G 7/04* (2006.01)
*F01K 23/00* (2006.01)
*F01K 13/00* (2006.01)
*F01K 25/08* (2006.01)

(52) U.S. Cl.
CPC ............. *F24J 3/08* (2013.01); *F01K 13/00* (2013.01); *F01K 23/00* (2013.01); *F01K 25/08* (2013.01); *F03G 7/04* (2013.01); *Y02E 10/10* (2013.01)

(58) Field of Classification Search
CPC .... F24J 3/08; F03G 7/04; F01K 25/08; F01K 23/00; F01K 13/00; Y02E 10/10
USPC .............. 60/641.2, 653, 655, 670
See application file for complete search history.

(56) References Cited

U.S. PATENT DOCUMENTS

| | | |
|---|---|---|
| 1,780,781 A | 11/1930 | Ehrhart |
| 4,578,953 A | 4/1986 | Krieger et al. |
| 4,700,543 A | 10/1987 | Krieger et al. |
| 5,531,073 A | 7/1996 | Bronicki et al. |

(Continued)

OTHER PUBLICATIONS

International Search Report and Written Opinion issued on May 22, 2015 in PCT/IB14/02518.

(Continued)

*Primary Examiner* — Hoang Nguyen
(74) *Attorney, Agent, or Firm* — Oblon, McClelland, Maier & Neustadt, L.L.P.

(57) ABSTRACT

The present invention provides a method for operating a plurality of independent, closed cycle power plant modules each having a vaporizer comprising the steps of: serially supplying a medium or low temperature source fluid to each corresponding vaporizer of one or more first plant modules, respectively, to a secondary preheater of a first module, and to a vaporizer of a terminal module, whereby to produce heat depleted source fluid; providing a primary preheater for each vaporizer; and supplying said heat depleted source fluid to all of said primary preheaters in parallel.

20 Claims, 4 Drawing Sheets

(56) References Cited

U.S. PATENT DOCUMENTS

| | | | |
|---|---|---|---|
| 5,816,048 A | 10/1998 | Bronicki et al. | |
| 7,320,221 B2 | 1/2008 | Bronicki | |
| 7,340,897 B2 | 3/2008 | Zimron et al. | |
| 8,667,799 B2 * | 3/2014 | Batscha | F01K 25/08 60/641.2 |
| 2007/0095065 A1 | 5/2007 | Kaplan et al. | |
| 2010/0242474 A1 | 9/2010 | Berger et al. | |
| 2011/0041502 A1 | 2/2011 | Zimron et al. | |
| 2011/0115445 A1 | 5/2011 | Bronicki et al. | |
| 2013/0025278 A1 | 1/2013 | Batscha | |
| 2014/0075937 A1 | 3/2014 | Batscha et al. | |

OTHER PUBLICATIONS

U.S. Appl. No. 14/584,950, filed Dec. 29, 2014, Batscha, et al.
International Search Report issued Nov. 21, 2012 in PCT/IB2012/001407.

\* cited by examiner

CASCADED POWER PLANT USING LOW AND MEDIUM TEMPERATURE SOURCE FLUID

CROSS-REFERENCE TO RELATED APPLICATIONS

This application is a continuation in part of U.S. Ser. No. 14/086,655, filed Nov. 21, 2013, which is a continuation in part of U.S. Ser. No. 13/190,148, filed Jul. 25, 2011, now granted as U.S. Pat. No. 8,667,799, the entire contents of both which are incorporated herein by reference.

FIELD

The present invention relates to the field of power plants. More particularly, the invention relates to a cascaded closed Rankine cycle power plant.

BACKGROUND

Low and medium temperature source fluids, hereinafter termed source fluids of the type described, are those fluids with a temperature less than about 177° C. (350° F.), such as geothermal fluids obtained from many production wells, and industrial liquids produced by various industrial processes. The East Mesa Development Project located in the Imperial Valley of Southern California near Holtville has been producing about 4 million pounds per hour of geothermal fluid at about 162° C. (324° F.). Such geothermal fluid is an example of source fluid of the type described.

Electricity is generally produced from source fluids of the type described using a closed Rankine cycle heat engine whose operating fluid is an organic fluid (e.g., Freon), such system being termed a power plant of the type described. A source fluid of the type described is applied to a vaporizer of a power plant of the type described containing liquid organic fluid whereby the latter is converted into a vapor. The vapor is expanded in a turbogenerator that converts some of the heat in the vapor to work and produces heat depleted organic vapor that is condensed in a condenser. The condensed organic fluid is returned to the vaporizer, and the cycle is repeated.

The condenser rejects the remaining heat in the heat depleted vapor into ambient air, if an air-cooled condenser is involved, or into cooling water, if a water-cooled condenser is used. Typically, the vaporizer is operated at a pressure that produces saturated or only slightly superheated vapor because the pressures involved are relatively low and the design of the heat exchanger that constitutes the vaporizer, the piping for conveying the vapor, and the turbine, are simplified. In order to maximize power output of a power plant of the type described, the temperature drop of the source fluid across the entire heat exchanger system of the power plant, and the evaporation temperature in the vaporizer must be optimized.

Prior art cascaded power plants utilizes a plurality of closed Rankine cycle power plant modules each having an associated heat exchanger, the source fluid being serially applied to the heat exchangers of each module. Whatever system is used, maximizing the net power produced by the system is of paramount importance. One technique for increasing the power is to extract more heat from the source fluid by increasing its temperature drop. With either a single stage or cascaded system, however, increasing the amount of heat extracted from the source fluid by increasing the temperature drop of the source fluid across the heat exchanger system has the effect of decreasing efficiency of the power plant because the mean temperature of the source fluid is reduced. This results in a reduction of the evaporization temperature of the operating fluid in the heat exchanger, thus reducing the Carnot efficiency of the power plant.

In another method for increasing the efficiency level of a power plant, a prior art power plant is operated by serially applying the source fluid to the vaporizers of the modules for producing heat depleted source fluid. A preheater is provided for each vaporizer, and the heat depleted source fluid is applied to all of the preheaters in parallel.

In an effort to increase the efficiency of a power plant of the type described, and to extract more power from the source fluid, it has been proposed to operate at super critical temperatures and pressures. In such case, the temperature of the vaporized organic fluid produced by the heat exchanger system is higher than in the above-described typical Rankine cycle power plant. While this approach is effective to increase the efficiency of the power plant and to increase its work output, the gains are offset by the higher cycle pump power consumption, as well as increased cost and complexity of the power plant whose pressure vessels must be designed to operate at pressures in the range of 500-600 psia.

Consequently, the present invention provides a cascaded closed Rankine cycle power plant using low and medium temperature source fluid which advantageously can produce an increased power level relative to that produced by prior art power plants.

Other advantages of the invention will become apparent as the description proceeds.

SUMMARY

The present invention provides a method for operating a plurality of independent, closed cycle power plant modules each having a vaporizer comprising the steps of:
(a) serially supplying a medium or low temperature source fluid to each corresponding vaporizer of one or more first plant modules, respectively, to a secondary preheater of a first module, and to a vaporizer of a terminal module, whereby to produce heat depleted source fluid;
(b) providing a primary preheater for each vaporizer; and
(c) supplying said heat depleted source fluid to all of said primary preheaters in parallel.

In one aspect, the source fluid is geothermal fluid.

In one aspect, the source fluid is fluid generated from an industrial process.

In one aspect, each of the power plant modules is operated at different temperatures.

In one aspect, each of the power plant modules is operated at different pressures.

In one aspect, the motive fluid for the power plant modules is organic fluid.

In one aspect, the same type of motive fluid is used in each module.

In one aspect, each module is based on a Rankine cycle.

The present invention is also directed to a power plant of the type having a plurality of independent, closed cycle power plant modules each of which comprising a vaporizer to which a medium or low temperature source fluid is serially applied for producing heat depleted fluid, and a primary preheater for each of said vaporizers, each of said primary preheaters adapted to preheat motive fluid condensate by means of said heat depleted fluid which is supplied to all of said preheaters in parallel, the improvement comprising a secondary preheater to which said source fluid is serially applied from a first vaporizer and from which said source fluid is supplied to a terminal vaporizer, said secondary preheater adapted to preheat motive fluid condensate exiting from a first primary preheater before being introduced to a corresponding first vaporizer.

Each module advantageously comprises a vaporizer responsive to the source fluid for converting the motive fluid condensate to vapor; a turbogenerator responsive to motive fluid vapor produced by said vaporizer for generating power and producing expanded motive fluid vapor; and a condenser for condensing said expanded motive fluid and producing liquid motive fluid condensate that is supplied to the primary preheater associated with said vaporizer.

The condenser may be water cooled or air cooled.

BRIEF DESCRIPTION OF THE DRAWINGS

In the drawings.

Note that similar reference numerals refer to similar components.

DETAILED DESCRIPTION

The present invention is an improved cascaded power plant using low and medium temperature source fluid (hereinafter the "source fluid"). One prior art power plant is operated by serially applying the source fluid to the vaporizers of the modules for producing heat depleted source fluid. A preheater is provided for each vaporizer, and the heat depleted source fluid is applied to all of the preheaters in parallel. Such power plant systems are described in U.S. Pat. No. 4,578,953, the disclosure of which is incorporated by reference. Furthermore, U.S. Pat. No. 4,700,543 discloses a similar cascaded power plant having a plurality of modules each of which being arranged in a plurality of levels. The disclosure of U.S. Pat. No. 4,700,543 is also incorporated by reference. In the present invention, an additional preheater is applied to one of the vaporizers. The temperature of the corresponding vaporized organic motive fluid is therefore increased, enabling more vapors to be extracted and to increase the power output of the power plant by the order of about 1-2%.

In addition, U.S. Pat. No. 5,531,073 discloses a similar cascaded power plant having a plurality of modules each of which being arranged in a plurality of levels. The disclosure of U.S. Pat. No. 5,531,073 is also incorporated by reference.

Figure 1:
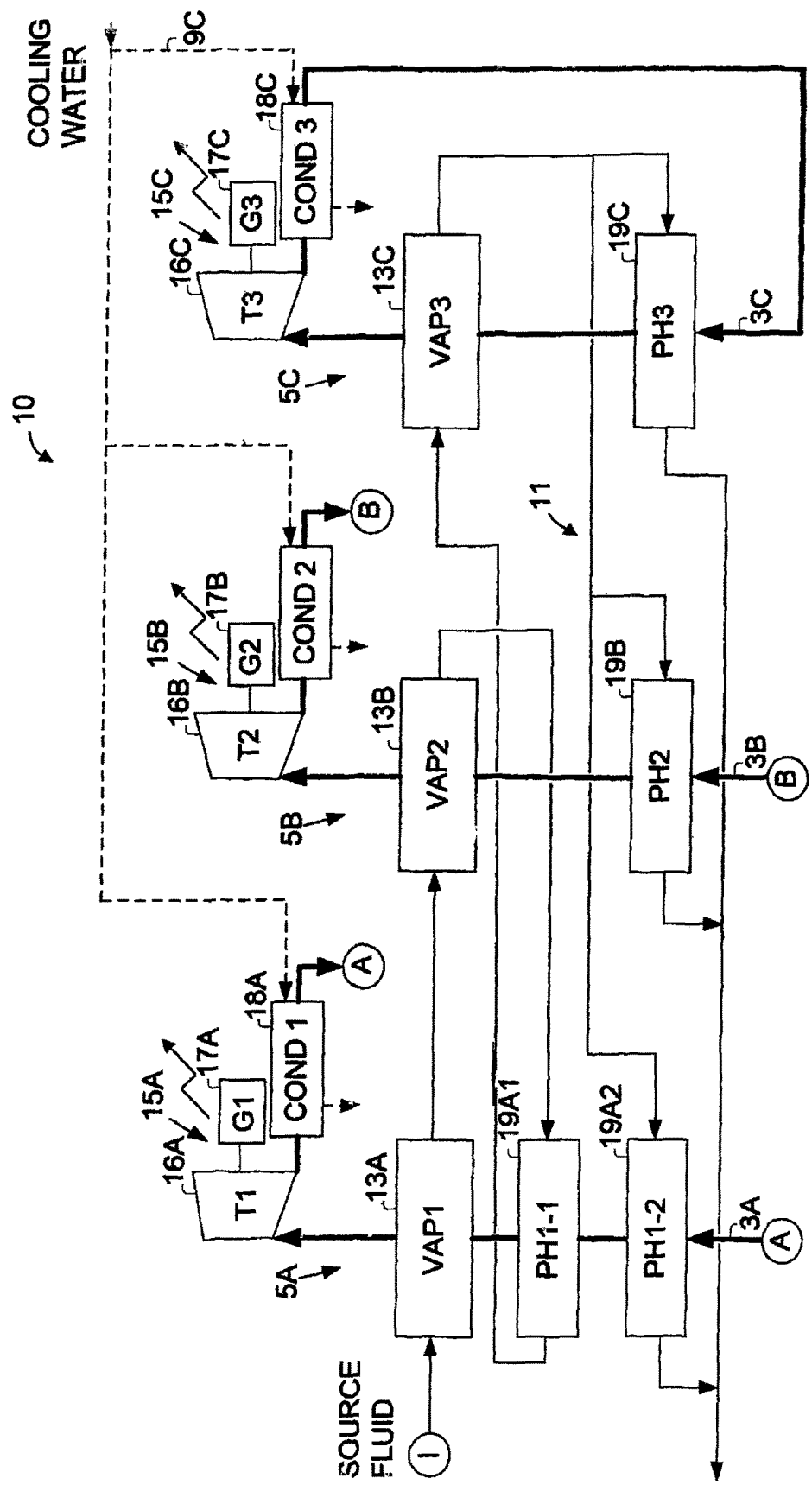
FIG. 1 is a block diagram of a cascaded power plant, according to one embodiment of the present invention.

FIG. 1 illustrates a cascaded power plant generally designated as 10, according to one embodiment of the present invention. Power plant 10 comprises a plurality of independent closed, Rankine cycle organic fluid power plant modules e.g. module 5A, module 5B and module 5C. Three such power plant modules are shown; but the invention is applicable to two or more independent power plant modules. Each of these modules is similar and as a consequence, only module 5C is described in detail.

Module 5C has a piping system 3C indicated by a thick line, through which the organic fluid circulates. Heated organic liquid is delivered to vaporizer 13C and is vaporized by means of heat from the source fluid introduced from inlet I and flowing through source fluid piping system 11. The organic liquid contained within vaporizer 13C is vaporized producing essentially saturated or slightly superheated vapor which is applied to turbine 16C of turbogenerator 15C. The vapor expands in turbine 16C, and work is produced so that electric generator 17C driven by turbine 16C produces electric power. The vapor exhausted from turbine 16C is applied to condenser 18C wherein the vapor is condensed into liquid by the application to the condenser of cooling water that flows through line 9C. Alternatively, an air cooled condenser can be used.

By means of a pump (not shown), condensate produced by condenser 18C is supplied via line 3C into preheater 19C that may be a physical part of, or separate from vaporizer 13C. Heat depleted source fluid, obtained from the outlet from vaporizer 13C, is applied to preheater 19C, to heat the organic fluid condensate. If the source fluid is geothermal, the cooled source fluid that exits preheater 19C may be supplied to a rejection well; or, if the source fluid is an industrial chemical, the cooled fluid may be transferred back to the process. The organic fluid that is heated in pre-heater 19C by the heat depleted source fluid is delivered to vaporizer 13C.

After being injected into piping system 11 at inlet I, the source fluid is first delivered to vaporizer 13A of module 5A. The source fluid that exits vaporizer 13A is delivered to vaporizer 13B of module 5B, and the source fluid that exits from vaporizer 13B is applied to intermediate preheater 19A1 of module 5A. Advantageously, preheater 19A1 can be portion of vaporizer 13A where it can operate as a preheater zone. Thereafter, the source fluid that exits intermediate preheater 19A1 is delivered to vaporizer 13C of module 5C. The source fluid that exits from vaporizer 13C is termed heat depleted source fluid because of the heat extracted from each of vaporizers 13A, 13B and 13C as well as preheater 19A1. This heat depleted fluid is applied to each of the preheaters 19A2, 19B and 19C, in parallel. That is to say, the present invention provides for serially applying a source fluid from inlet I to vaporizer 13A, vaporizer 13B, intermediate preheater 19A1, and vaporizer 13C and for applying heat depleted source fluid to each preheater 19A2, 19B, and 19C in parallel. The source fluid that exits from each of the preheaters 19A2, 19B, and 19C can be conveyed, as shown, to a rejection well if the source fluid is geothermal. With respect to module 5A, the motive fluid condensate produced by condenser 18A is delivered to first stage preheater 19A2 via line 3A, additionally heated by intermediate preheater 19A1 and then vaporized by vaporizer 13A and the motive fluid vapor produced is supplied to vapor turbine 16A for producing power using electric generator 17A run by vapor turbine 16A. Alternatively, a recuperator can be used for utilizing heat present in the organic vapor exiting vapor turbine 16A to heat motive fluid condensate produced by condenser 18A before it is delivered to first stage preheater 19A2. In addition, alternatively, an electric generator can be used for producing electric power from vapor turbines 16A and 16B. Furthermore, a recuperator can also be used in power plant module 5B so that organic vapor exiting vapor turbine 16B heats motive fluid condensate produced by condenser 18B before it is delivered to preheater 19B. In such a case, less heat can be extracted from the heat depleted heat source fluid. This can be advantageous particularly which geothermal fluid such as liquid or brine is used as the heat source fluid since, under such a situation, a further power plant module can be used to utilize heat still present therein.

Figure 2:
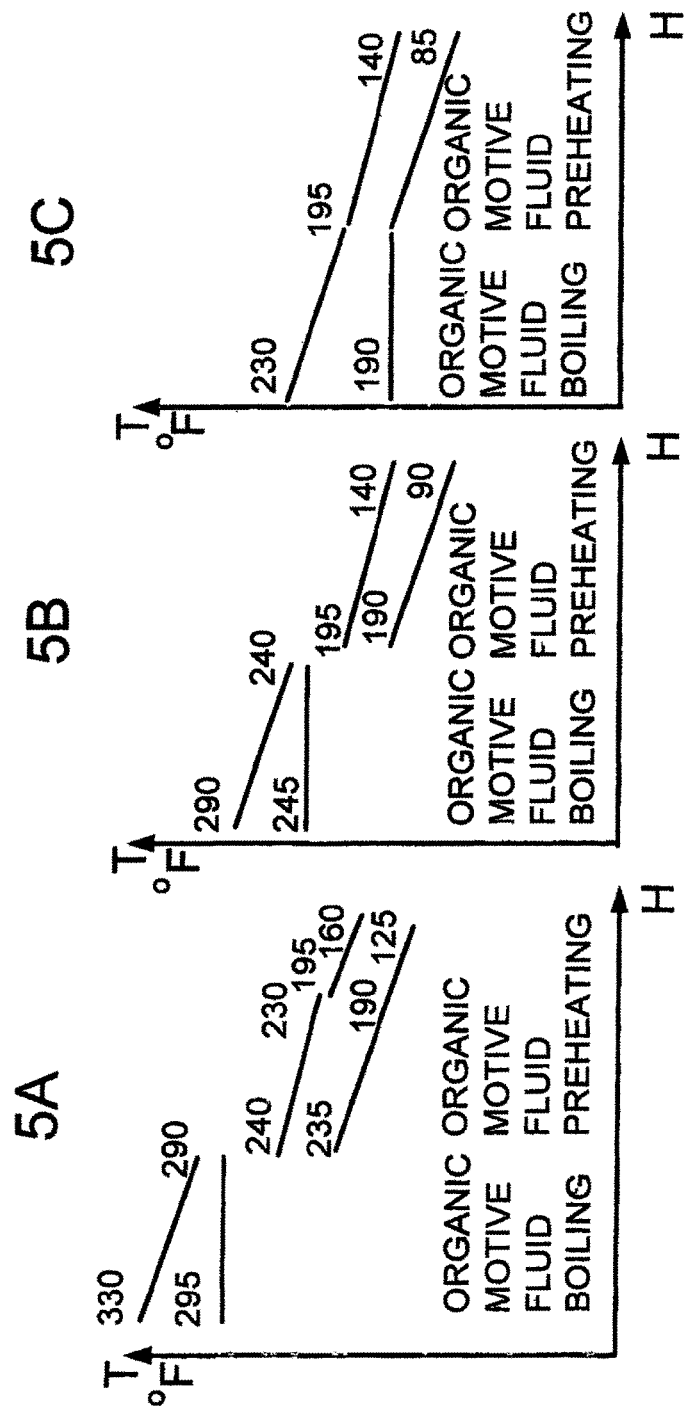
FIG. 2 shows an example of temperature-heat diagrams for the power plant modules and
FIG. 3 is a block diagram of a cascaded power plant, according to the embodiment of the present invention described with reference to FIG. 3.

FIGS. 2A, 2B and 2C illustrate an example of a typical temperature-heat diagram for the three power plant modules 5A-C shown in FIG. 1. From these Figures it can be seen that due to the additional pre-heating stage or pre-heater used in power plant module 5A, a higher boiling or vaporizing temperature can be achieved. As a consequence, a higher overall power plant efficiency level can be achieved in power plant module 5A.

Figure 1A:
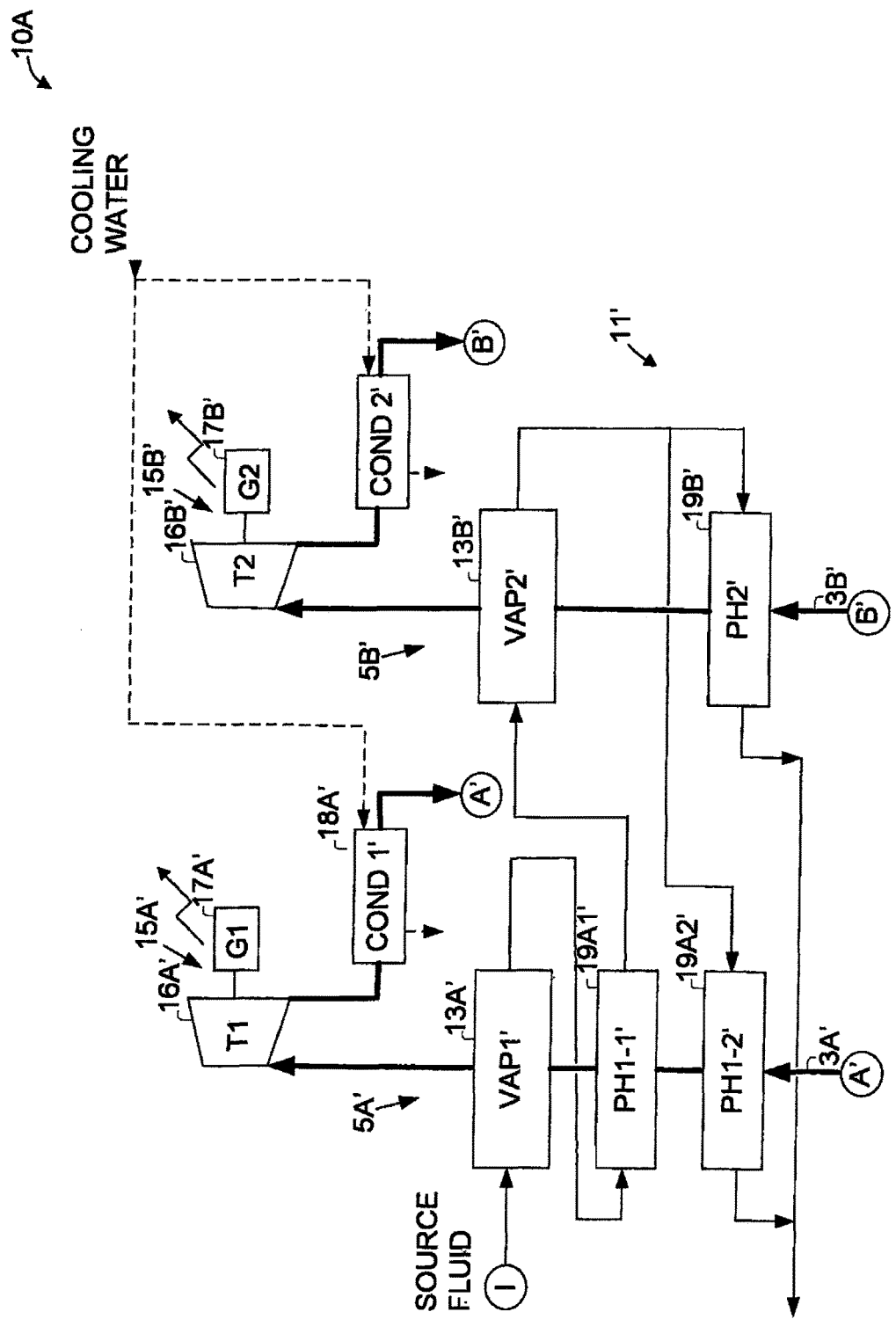
FIG. 1A is a block diagram of a cascaded power plant, according to another embodiment of the present invention.
Figure 3:
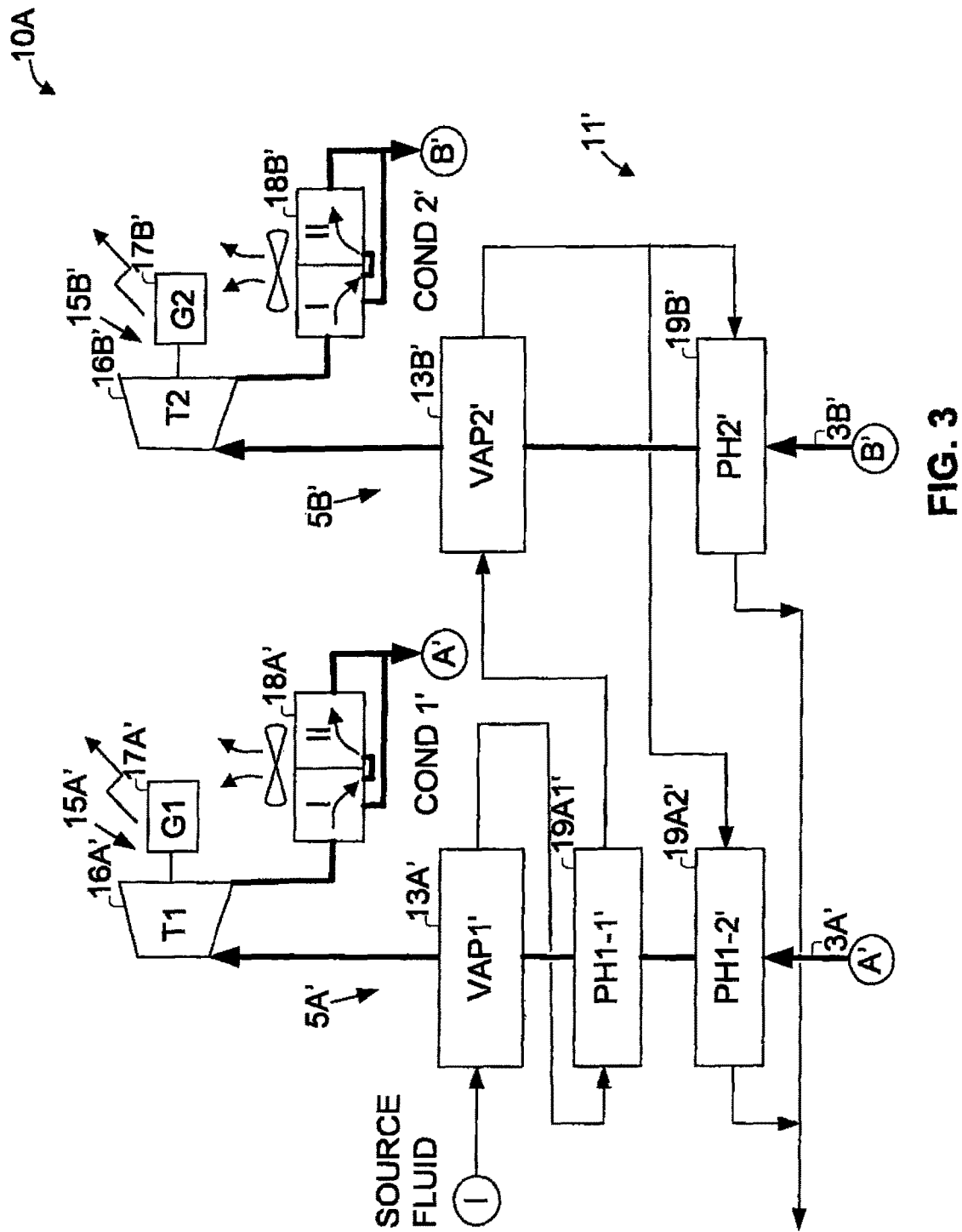

In situations where only two power plant modules are used, it can be advantageous to use the secondary preheater of the first power plant module such that the medium or low temperature source fluid exiting the vaporizer in the first power plant module be supplied to the secondary preheater of the first power plant module prior to supplying it to the vaporizer of the second power plant module (see FIG. 1A). In such a manner, the heat transfer from the medium or low temperature source fluid can be optimized. Moreover, steam, e.g. geothermal steam, can be used in the secondary preheater of the first power plant module to competently increase the amount of heat transferred to the motive fluid in the secondary preheater of the first power plant module. Also, in this embodiment, heat depleted medium or low temperature source fluid exiting the vaporizer in the second power plant module can be advantageous supplied in parallel to the primary preheaters in the first power plant and second module. Furthermore, also in this embodiment, either water cooled or air cooled condensers can be used. In addition, in such a case, two single pass condensers connected in series can be used in each of the first and second power plant modules (see FIG. 3) to facilitate and optimize operation of the power plant modules at relatively low temperatures of the medium or low temperature source fluid (e.g. about 260° F.) particularly when using an organic motive fluid such as butane, e.g. n-butane, iso-butane etc. In this example, air cooled condensers are referred to. In such two single pass condensers connected in series, the use of drainage of the motive fluid condensate between the first pass and the second pass shown in FIG. 3 is advantageous in providing improved heat exchanger performance for such condensers. Note that while it is shown on FIG. 3 that each power plant module has a separate electric generator, advantageously, both turbines T1' and T2' respectively can run a joint electric generator which can be interposed between the turbines. Furthermore, while 260° F. is given as an example of relatively low temperatures of the medium or low temperature source fluid, in accordance with this embodiment of the present invention, temperatures of between e.g. about 235° F. to 280° F. can also be used. When the temperatures is about 235° F., it could be advantageous to use a single power plant module using an organic motive fluid such as butane, e.g. n-butane, iso-butane, having a condenser (advantageously air-cooled) comprising two single-pass condenser portions connected in series in the power plant module which could include as well a preheater in addition to the vaporizer.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A method for operating a plurality of independent, closed cycle power plant modules each having a vaporizer, wherein a first plant module of said plurality of plant modules having a primary preheater and a secondary preheater connected in series to supply a motive fluid to the vaporizer of said first plant module receives a source fluid, said method comprising the steps of:
   (a) supplying a medium or low temperature source fluid serially from the vaporizer of the first plant module of the plurality of plant modules to said secondary preheater of the first plant module, and thereafter to a vaporizer of a terminal module of the plurality of plant modules, whereby to produce heat depleted medium or low temperature source fluid;
   (b) providing a primary preheater for each vaporizer;
   (c) supplying said medium or low temperature heat depleted source fluid to all of the primary preheaters in parallel.

2. A method according to claim 1, wherein the source fluid is a geothermal fluid.

3. A method according to claim 1, wherein each of the power plant modules is operated at different temperatures.

4. A method according to claim 3, wherein each of the power plant modules is operated at different pressures.

5. A method according to claim 1, wherein the motive fluid for the power plant modules is an organic fluid.

6. A method according to claim 5, wherein the same motive fluid is used in each module.

7. A method according to claim 1, wherein each module is based on a Rankine cycle.

8. In a power plant of the type having a plurality of independent, closed cycle power plant modules each of which comprising a vaporizer to which a medium or low temperature source fluid is serially supplied for producing heat depleted fluid, and a primary preheater for each of said vaporizers, each of said primary preheaters adapted to preheat condensed motive fluid by means of said heat depleted fluid which is supplied to all of said preheaters in parallel, the improvement comprising a secondary preheater to which said source fluid is serially applied from a first vaporizer of a first module of said plurality of plant modules and from which said source fluid is supplied to a terminal vaporizer of a terminal module of said plurality of plant modules, said secondary preheater adapted to preheat motive fluid condensate exiting from a first primary preheater before being introduced to a corresponding first vaporizer.

9. The power plant of claim 8, wherein the motive fluid is an organic fluid.

10. The power plant of claim 8, wherein the source fluid is a geothermal fluid.

11. The power plant of claim 8, wherein each power plant module is a closed Rankine cycle power plant module.

12. The power plant of claim 11, wherein each module comprises: (a) a vaporizer responsive to the source fluid for producing motive fluid vapor; (b) a turbogenerator responsive to motive fluid vapor produced by said vaporizer for generating power and producing expanded motive fluid; and (c) a condenser for condensing said expanded motive fluid and producing liquid motive fluid condensate that is supplied to the primary preheater associated with said vaporizer.

13. The power plant according of claim 12, wherein the condenser is air cooled.

14. The power plant according to claim 13 wherein two power plant modules are included.

15. The power plant according to claim 14 wherein said condenser of each said power plant modules comprises two single-pass condensers connected in series.

16. The power plant according to claim 10, wherein the apparatus is provided for supplying said geothermal fluid to said power plant, and wherein said geothermal fluid has a temperature between 235° F. and 280° F.

17. The power plant according to claim 10, wherein the apparatus is provided for supplying said geothermal fluid to said power plant, and wherein said geothermal fluid has a temperature less than about 260° F.

18. The method according to claim 2, wherein the geothermal fluid comprises geothermal liquid.

19. The method according to claim 2, further comprising supplying geothermal steam to said secondary preheater.

20. The power plant according to claim 14, wherein said first plant module of said plurality of plant modules further comprises a recuperator for heating organic motive fluid condensate exiting the condenser of the first plant module of said plurality of plant modules using the expanded motive fluid exiting the turbogenerator of the first plant module of said plurality of plant modules.

\* \* \* \* \*